United States Patent [19]

Miller et al.

[11] Patent Number: 4,838,392
[45] Date of Patent: Jun. 13, 1989

[54] SEMI-ACTIVE DAMPER FOR VEHICLES AND THE LIKE

[75] Inventors: Lane R. Miller, Raleigh; Charles M. Nobles, Jr., Fuquay-Varina, both of N.C.; Dennis P. McGuire, Erie, Pa.

[73] Assignee: Lord Corporation, Erie, Pa.

[21] Appl. No.: 81,841

[22] Filed: Aug. 5, 1987

[51] Int. Cl.⁴ ............................................. F16F 9/52
[52] U.S. Cl. ................................. 188/277; 137/513.7; 188/286; 188/299; 188/315; 188/318; 188/322.14; 251/129.08; 280/707; 280/714
[58] Field of Search ............... 188/315, 299, 285, 276, 188/277, 286, 318, 322.13, 322.14; 280/707, 714; 251/65, 129.05, 129.08; 137/513.7

[56] References Cited

U.S. PATENT DOCUMENTS

| | | | |
|---|---|---|---|
| 3,321,210 | 5/1967 | Delchev | 280/707 X |
| 3,807,678 | 4/1974 | Karnopp et al. | 248/358 R |
| 4,337,849 | 7/1982 | Siorek et al. | 188/276 |
| 4,468,050 | 8/1984 | Woods et al. | 280/707 |
| 4,468,739 | 8/1984 | Woods et al. | 364/424 |
| 4,491,207 | 1/1985 | Boonchanta et al. | 188/299 |
| 4,530,374 | 7/1985 | Akagi et al. | 251/65 X |
| 4,696,489 | 9/1987 | Fujishiro et al. | 280/707 |

FOREIGN PATENT DOCUMENTS

| | | | |
|---|---|---|---|
| 2038571 | 2/1972 | Fed. Rep. of Germany | 188/315 |
| 769319 | 3/1957 | United Kingdom | 188/322.14 |
| 1188453 | 4/1970 | United Kingdom | 188/318 |
| 1363303 | 8/1974 | United Kingdom | 188/322.14 |

Primary Examiner—George E. A. Halvosa
Attorney, Agent, or Firm—Bell, Seltzer, Park & Gibson

[57] ABSTRACT

The damper assembly has improved valve means that includes at least one annular movable valve member of the voice-coil type. Such valve member is formed at least in part of composite material that increases the strength and stiffness of the member, while reducing its coefficient of thermal expansion and its weight. In a preferred embodiment of the invention, the assembly includes two movable annular valve members which are driven in unison with each other such that when one occupies a flow-permitting position the other occupies a flow-inhibiting position. Check valves utilized in the assembly preferably are of a resilient split-ring type.

15 Claims, 1 Drawing Sheet

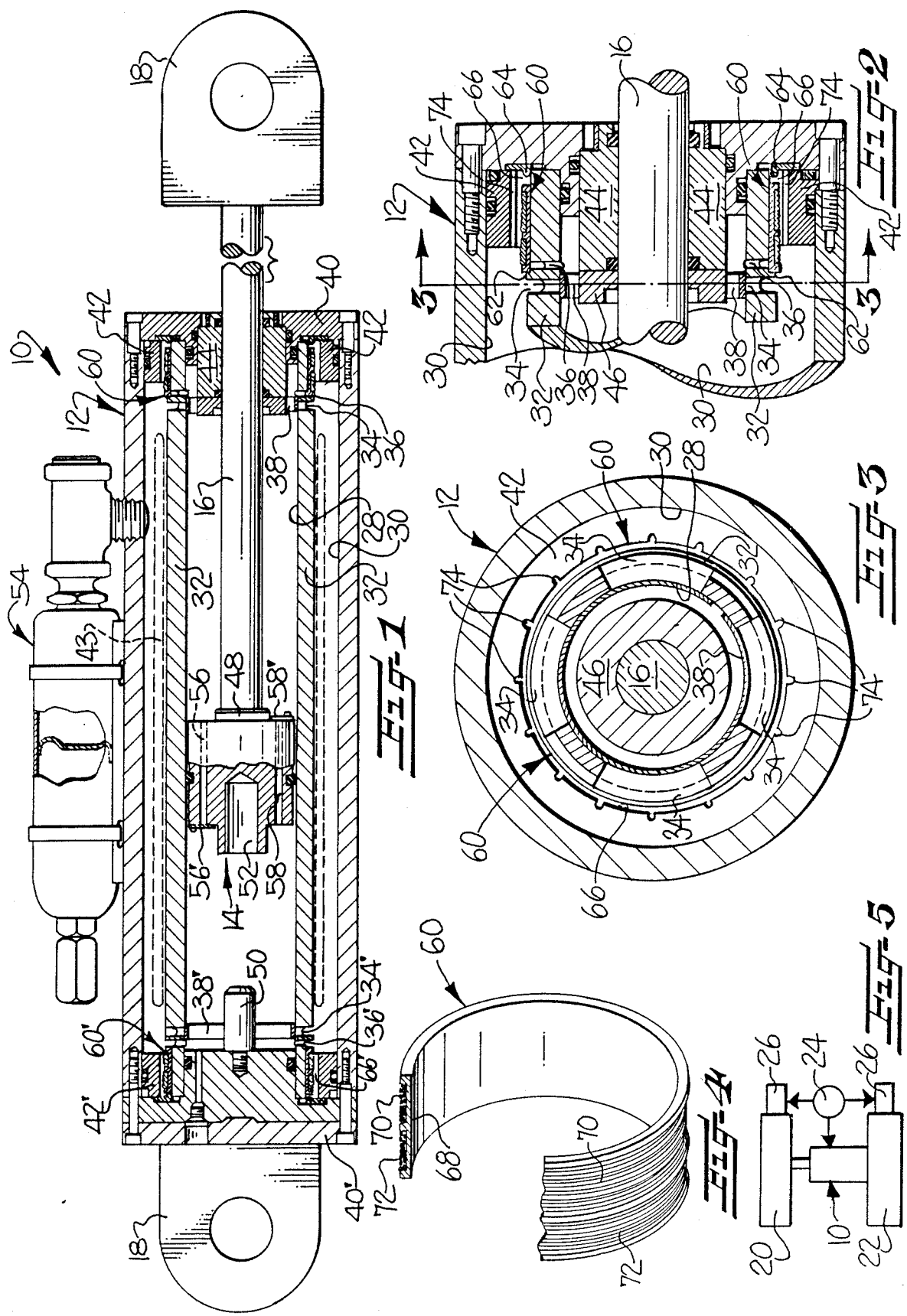

SEMI-ACTIVE DAMPER FOR VEHICLES AND THE LIKE

FIELD OF THE INVENTION

This invention relates to hydraulic damper assemblies such as are used in vehicle suspensions and other systems to attenuate the transmission of vibrations, shocks and similar motion between relatively movable members interconnected by the dampers. The invention more specifically relates to an improved hydraulic damper assembly that is of the "semi-active" type and that incorporates valve means of the "voice-coil" type.

BACKGROUND OF THE INVENTION

Hydraulic dampers of the semi-active type are known in the art: see, e.g., U.S. Pat. Nos. 3,807,678, 4,468,050, 4,468,739 and 4,491,207. Such dampers differ from purely passive ones in that the flow of hydraulic fluid between opposite ends thereof is rapidly and continuously controlled during operation of the dampers. They differ from fully-active dampers or actuators in that they do not require a pump or similar source of pressurized hydraulic fluid. When operated in accordance with an appropriate control policy, semi-active dampers are potentially capable of providing vibration attenuation greatly superior to that provided by passive dampers, and closely approaching that provided by fully-active hydraulic dampers or actuators, while being much less expensive than fully active dampers to acquire and operate.

If the benefits potentially available from a semi-active damper are to be realized in an actual vehicle suspension or other "real-world" environment, as opposed to merely in the laboratory, the damper should be of compact, durable and economical construction. Additionally, the valve components of the damper must operate reliably and rapidly even under adverse operating conditions. The use in a semi-active damper for a motorcycle of a control valve of the "voice-coil" type is disclosed in U.S. Pat. 4,491,207. Valves of such type work satisfactorily when they are of relatively small size and are not subjected to large temperature differentials. However, difficulties have been encountered when such valves are used in dampers that are of large size, and/or that are subjected to elevated temperatures. In such utilization, the movable annular member or members of the valve means may at times not move freely between its flow-permitting and flow-restricting position, and/or may permit excessive leakage when in the latter position thereof.

With the foregoing in mind, the primary object of the present invention is the provision of a semi-active damper assembly that is of durable, compact and economical construction and that has improved valve means.

SUMMARY OF THE INVENTION

In accordance with the one aspect thereof, the present invention provides a hydraulic semi-active damper assembly having a piston-containing cylinder, of a double-wall type, that has first and second passageways at each of its opposite ends which provide communciation between its inner and outer chambers. Check valves of a highly reliable and durable split-ring type control fluid flow through the first passageways. Fluid flow through the second passageways is controlled by control valve means of the voice-coil type. The voice-coil valve means includes annular valve members associated with respective ones of the second passageways and movable relative thereto between flow-restricting and flow-preventing positions. One of the annular members is driven to its flow-restricting position while the other member is simultaneously driven to its flow-permitting position during each actuation of electromagnetic valve drive means located within the cylinder.

In accordance with a related aspect thereof, the present invention provides an improved damper assembly in which flow-controlling valve means of the voice-coil type utilizes at least one annular movable valve member that is formed, at least in part, of lightweight composite material that causes the annular member to possess high hoop strength and stiffness, and a low coefficient of thermal expansion.

BRIEF DESCRIPTION OF THE DRAWINGS

Other features of the invention will be apparent from the following description of an illustrative embodiment thereof, which should be read in conjunction with the accompanying drawings, in which:

FIG. 1 is a view, primarily in longitudinal section and partially in elevation, of a hydraulic damper assembly in accordance with the invention, the accumulator and rod components of the assembly being partially broken away;

FIG. 2 is an enlarged fragmentary sectional view of right-end components of the assembly of FIG. 1;

FIG. 3 is a transverse section taken approximately along the line 3—3 through the components of FIG. 2;

FIG. 4 is a partially broken away perspective view of the annular valve member of the voice-coil valve means of the assembly; and FIG. 5 is a schematic representation of spaced numbers interconnected by the assembly, and of related sensor and control components.

DESCRIPTION OF THE PREFERRED EMBODIMENT

The numeral 10 in FIG. 1 designates a hydraulic damper assembly, generally of the piston-and-cylinder type, that includes cylinder, piston and rod components 12, 14 and 16, respectively. The free outer end of rod 16 and the end of cylinder 10 distal therefrom are provided with brackets 18 or other suitable connectors by means of which assembly 10 can be connected to spaced and relatively movable members such as the members 20, 22 schematically indicated in FIG. 5 of the drawings. Such members might, for example, respectively be the body and frame components of an automobile or other vehicle, in which case the customary function of assembly 10 would be to attenuate the transmission of vibrations, shocks and/or other motions from frame member 22 to body member 20 of the vehicle. As is also indicated in FIG. 5, damper assembly 10 is of the "semi-active" type that during operation receives control inputs from a controller 24 that operates in accordance with a preselected control policy and inputs received from motion sensing means 26 associated with one or both of the members 20, 22 interconnected by the damper assembly. The control policy employed may be and preferably is that disclosed in U.S. Pat. Nos. 3,807,678 and 4,491,207. When such policy is properly implemented by the damper assembly and controller, it results in reduction (ideally to zero) of the damping coefficient of the assembly whenever the motion condition across the assembly is such that the generated damping forces would amplify, rather than attentuate, the transmission of vibratory and/or other motion from member 22 to member 20. This customarily would occur whenever supported member 20 was traveling in the same direction as, and slower than, supporting member 22.

Referring once again primarily to FIG. 1 and also to FIGS. 2 and 3, cylinder 12 of assembly 10 is of a double-wall type having a central inner chamber 28 separated from an encircling outer chamber 30 by a cylindrical inner wall 32. Adjacent their opposite ends chambers 28, 30 are interconnected by first and second sets of parallel passageways 34, 36 and 34', 36' that extend radially through inner cylinder wall 32 at spaced intervals about its circumference. Check valve members 38, 38' of the resilient split-ring type are disposed within inner cylinder chamber 28 adjacent respective ones of the passageways 34, 34'. Members 38, 38' prevent flow from inner chamber 28 to outer chamber 30 through the respective passageways 34, 34'. When members 38, 38' are in firm engagement with the thereto adjacent inner surfaces of chamber 28, as they normally are due to their inherent tendency to expand radially outwardly, they also block fluid flow in the opposite direction, i.e., from outer chamber 30 to inner chamber 28. However, when the fluid pressure upon the radially outermost surface of either member 38, 38' is significantly greater than the fluid pressure upon its inner surface, such member undergoes contraction and as a result thereof then permits fluid flow through the therewith associated ports 34 or 34' from outer chamber 30 into inner chamber 28.

The opposite ends of cylinder 12 and the chambers 28, 30 therein are closed by end members 40, 40'. Such members respectively include annular portions 42, 42' that extend in concentric radially spaced relationship about thereto adjacent opposite end portions of cylinder end wall 32 and which, in conjunction therewith, define pole pieces of an electromagnet that further includes an energizing coil 42 that is wound about the central section of wall 32. End member 40 further includes a bronze bearing 44 through which passes rod 16 of assembly 10, and a bumper element 46 that is cooperable with a mating element 48 associated with piston 14 to arrest extreme extension of assembly 10. The same function is provided during extreme contraction or compression of the assembly by cooperating bumper elements 50, 52 respectively associated with end member 40' and the confronting end of assembly piston 14. End member 40' is also provided with a normally closed fill port through which cylinder 12 is initially charged with hydraulic fluid (not shown). Such fluid fills all of the available space within cylinder chambers 28, 30 and also within the fluid-containing part of a pressurized fluid accumulator 54 mounted upon the exterior of cylinder 12 and communicating with its outer chamber 30. Accumulator 54 serves the customary function of compensating for the different quantities of fluid that are displaced during extension versus contraction of assembly 10.

A plurality of orifices 56, 58, of which only one each are shown in the drawings, extend through assembly piston 14 adjacent the periphery thereof. Each orifice 56 has a therewith associated resilient pressure-relief valve element 56' that prevents flow through such orifice during contraction or compression of assembly 10, and that permits flow through the orifice when the pressure generated during extension of the assembly overcomes the preselected spring force of the element 56'. Each orifice 58 similarly has a therewith associated resilient valve element 58' that prevents fluid flow through the orifice during assembly extension while permitting flow through the orifice during assembly retraction when the fluid pressure is sufficient to unseat resilient valve element 58'. The pressure required to unseat valves 56', 58' is greater than that generated during norml operation of damper assembly 10. Orifices 56, 58 and their associated valve elements 56', 58' therefore only perform a pressure relieving "safety" function. While valve elements 56', 58' illustratively are in the form of leaf springs mounted upon the opposite side faces of piston 14, they of course might take other forms.

Fluid flow through the radially extending ports 36, 36' adjacent opposite ends of cylinder chambers 28, 30 is controlled by control valve means of the voice-coil type. Such valve means includes annular valve members 60, 60' that respectively encircle the opposite end portions of cylinder inner wall 32 which are disposed radially inwardly of portions 42, 42' of cylinder end members 40, 40. Each valve member 60, 60' is slidably movable along the thereby encircled section of inner wall 32 between a first posiiton, wherein such member permits relatively free fluid flow through the thereto adjacent ones of the passageways 36, 36', and a second position wherein the valve member overlies such passageways and permits only restricted fluid flow therethrough. When valve member 60 or 60' occupies its second position, the fluid must pass into and along part of the length of the narrow annular space between the cylindrical inner surface of such member and the thereby-encircled then exhibited by assembly (hereinafter referred to as the "on-state" damping) therefore is then of a relatively large magnitude, preferably being at least seventy percent of the critical damping, that is dependent primarily upon the radial clearance between valve members 60, 60' and cylinder wall 32.

As is indicated in FIG. 1 of the drawings, which shows valve member 60 in its flow-restricting position and valve member 60' in its flow-permitting position, whenever one of the members occupies either one of the aforesaid positions, the other member occupies the other of such positions. Movement of valve member 60 beyond its illustrated flow-restricting position is prevented by engagement between such member and a flange-like stop element 62 upon wall 32, while movement of the member beyond its flow-permitting position is precluded by its engagement with a stop element 64 disposed at the closed end of the annular pole-piece cavity 66 into which the valve element extends. Identical stop elements are provided in association with the valve member 60' at the opposite end of assembly 10.

Valve members 60, 60' are of the identical construction shown in FIG. 4 of the drawings. Each valve member consists of an annular relatively thin body 68 formed of a lightweight and non-magnetizable metal such as aluminum. The exterior of body 68 is encircled by a coil 70 through which an electrical current is passed when it is desired to impart movement to the valve member. Body 68 is also encircled and reinforced by composite material 72 that includes endless high-strength filamentary material embedded within a strong and stiff plastic matrix material such as epoxy. The filamentary material of composite 72 is wound about body 68 at approximately a 90° angle relative to its central axis, so as to maximize the hoop strength, as well as the stiffness, of the valve member. The aforesaid construction of members 60, 60' affords various benefits. It provides a valve member that is significantly lighter than an all-metal one of comparable strength, and that is therefore capable of more rapid movement. It also significantly diminishes the possibility of the valve member being so deformed, by the fluid pressures to which it is subjected during use, as to not slide freely along the thereby encircled end portion of cylinder wall 32. The deformation problem is particularly acute with members of relatively large diameter, and less so with members of relatively small diameter. A further benefit of the composite construction of members 60, 60' is that it allows the coefficient of thermal expansion thereof to be very low. Such coefficient is preferably at least zero, and may even be negative.

In the latter connection, the coefficient of thermal expansion of members 60, 60' is significant since the radial clearance between each member 60, 60' and the thereby encircled end portion of inner cylinder wall and affects the on-state damping coefficient of assembly 10, as has been previously noted. While it is desirable for the aforesaid damping coefficient to remain substantially constant, significant changes have heretofore occurred during operation of the damper at elevated temperatures. Elevated temperature decreases the viscosity of the hydraulic fluid within the damper. Unless compensated for in some fashion, the decrease in fluid viscosity in turn causes decrease in the on-state damping coefficient of the damper. while the elevated temperature also increases the diameter of cylinder inner wall 32, this has little if any compensating effect if the encircling annular valve members are formed entirely of aluminum or similar metal, since in such case they also increase in dimeter. However, when the annular valve members are of the construction illustrated in FIG. 4 and having a low coefficient of thermal expansion, the diameter thereof does not significantly increase at elevated temperatures, but rather remains substantially constant or may even decrease, i.e., the members 60, 60' may have a negative coefficient of thermal expansion. Under these circumstances, the increase in diameter experienced by the end portions of inner wall 32 at elevated tempertures can and does reduce the radial clearance between such wall and members 60, 60'. This in turn compensates in substantial part if not entirely for the decrease in viscosity of the hydraulic fluid at the elevated temperatures. Consequently, the damping coefficient of damper assembly 10 is affected to a much lesser extent, if at all, by temperature change.

To further facilitate rapid unobstructed movement of members 60, 60' between their flow-restricting and flow-permitting positions, the aforesaid members have a small and relatively "streamlined" profile, and grooves 74 (FIG. 3) of hemispherical cross-sectional shape are provided in the inner surfaces of the sections 42, 42' of end members 40, 40'. Such grooves facilitate free egress of the hydraulic fluid displaced from annular cavities 66, 66, during movement of members 60, 60' toward the closed ends of such cavities.

Electrical current is supplied to the coils 70, 70' of annular valve members 60, 60', and to the electromagnetic field coil 43, from a suitable electrical junction member 76 via interconnecting electrical connectors (not shown). The connectors extending to the coil 70, 70' upon annular valve members 60, 60' are of course sufficiently flexible, along at least part of their lengths, as to not impede free axial movement of such members.

During operation of assembly 10, power may and usually would be continuously supplied to electromagnetic field coil 43. When current is simultaneously supplied to the coils 70, 70' of annular members 60, 60', such members therefore immediately undergo simultaneous rapid movement to either the left-most positions thereof illustrated in FIG. 1, or to right-most positions wherein member 60 occupies its flow-permitting position and member 60' occupies it's flowrestricting position. The direction of movement of the members is dependent upon, and is reversed by reversal of, the direction of the current flow through coils 70, 70'. The direction of current flow in one of the coils is always the same as that in the other of the coils, which results in the members 60, 60' always occupying different ones of their flow-permitting and flow-restricting positions.

At those times when it is desirable for relative movement across damper 10 to generate damping forces, i.e., when it is desired for the damper to be "on," the electrical current caused by controller 24 to be directed to coils 70, 70' of annular valve members 60, 60' causes such members to occupy their FIG. 1 positions during extension of the assembly, and their opposite positions during retraction or "compression" of the assembly. The hydraulic fluid then displaced from chamber 28 must therefore pass through part of the restricted annular space between one of the members 60, 60' and the adjacent end portion of cylinder wall 32. The damping coefficient of assembly 10 then is of its preselected high on-state magnitude.

At those times when no or only minimal damping forces are desired, the current then directed to coils 70, 70' causes valve members 60, 60' to occupy their FIG. 1 positions when assembly 10 is undergoing retraction, and their other positions when the assembly is undergoing extension. During retraction the hydraulic fluid flows from the left end to the right end (as viewed in FIG. 1) of inner chamber 28 via radial passageways 36', outer cylinder chamber 30, and radial passageways 34. During extension the equally free fluid flow from the right to the left end of chamber 28 similarly is via radial passageways 36, outer chamber 30 and radial passageways 34'. The damping coefficient of assembly 10 is then of its minimal off-state magnitude. This ideally would be zero, and preferably is no more than about one-fifth of the on-state damping coefficient.

While a preferred embodiment of the invention has been specifically shown and described, this was for purposes of illustration only, and not for purposes of limitation, the scope of the invention being in accordance with the following claims.

We claim:

1. In a hydraulic damper assembly for damping the transmission of motion between spaced and relatively movable members interconnected thereby, said assembly including a double-wall cylinder adapted to be connected to one of said members and having an inner fluid chamber and an outer annular fluid chamber encircling said inner chamber, a piston disposed within and movable longitudinally of said inner chamber, a rod connected to said piston and having an end portion extending from said cylinder and adapted to be connected to the other of said relatively movable members, the improvement comprising:

means defining a pair of first and second parallel passageways interconnecting said inner and outer chambers adjacent one end thereof;

means defining another pair of first and second parallel passageways interconnecting said chambers adjacent the opposite end thereof;

pressure responsive check valve means associated with said first passageways for inhibiting fluid flow therethrough from said inner chamber to said outer chamber, and for at times permitting relatively free fluid flow through said first passageways from said outer chamber to said inner chamber;

control valve means associated with said second passageways for controlling fluid flow therethrough, said control valve means including two movable control valve members associated with and located adjacent respective ones of said second passageways, each of said movable valve members being moveable between a flow-restricting position and a flow-permitting position wherein said valve member respectively permits only relatively restricted fluid flow and relatively unrestricted fluid flow through the therewith associated one of said second passageways, said control valve means having a first operating condition wherein one of said valve members occupies said flow-permitting position thereof while the other of said valve members occupies said flow-restricting position thereof, and having a second operating condition wherein said one of said valve members occupies said flow-restricting position thereof and said other of said valve members occupies said flow-permitting position thereof;

electromagnetic drive means for selectively effecting rapid transition of said valve means between said operating conditions and for thereby effecting rapid and substantially simultaneous reversals of the positions of said valve members, the movements of each of said valve members between said flow-restricting and flow-permitting positions thereof being produced by electromagnetic forces imparted thereto by said drive means.

2. An assembly as in claim 1, wherein said drive means includes magnetic field generating means for generating a magnetic field within said cylinder in the vicinity of said movable valve members, and electrical current conducting means carried by said control valve members and cooperable with said magnetic field for driving said members in a first direction in response to current flow in a first direction through said conducting means, and in an opposite direction in response to current flow in an opposite direction through said conducting means.

3. An assembly as in claim 2, wherein said magnetic field generating means includes an inner cylindrical wall located between said cylinder chambers and formed of magnetizable material, said control valve members respectively encircling and being movable along opposite end portions of said wall, and said control valve members having smaller coefficients of thermal expansion than the coefficients of thermal expansion of said end portions of said wall.

4. An assembly as in claim 3, wherein said magnetic field generating means further includes electric current conducting coil means wound about said inner cylinder wall and located within said outer chamber of said cylinder.

5. An assembly as in claim 1, wherein each of said valve members is of annular shape and is formed at least in part of composite material, said composite mateiral including high-strength filamentary material encircling the central axis of said member and enhancing the hoop strength there.

6. Apparatus as in claim 5, wherein said composite material further includes stiff and strong plastic matrix material within which said filamentary material is embedded.

7. Apparatus as in claim 6, wherein said composite material has a coefficient of thermal expansion of no more than approximately zero.

8. Apparatus as in claim 7, wherein said composite material has a negative coefficient of thermal expansion.

9. Apparatus as in claim 7, wherein each of said annular valve members includes an annular body portion formed of lightweight nonmagnetic metal, said composite material being carried by said body.

10. In a hydraulic damper assembly of the piston-and-cylinder type, said assembly including fluid conducting means for conducting hydraulic fluid between opposite end portions of said cylinder, and valve means of the voice-coil type for controlling the flow of hydraulic fluid through said fluid conducting means, said valve means including at least one annular member adapted to undergo axial movement in response to passage of an electrical current within electrical windings upon such member, the improvement comprising:

said annular member being formed at least in part of composite material having high hoop strength and stiffness and a low coefficient of thermal expansion, said composite material including high-strength filamentary material separate from said electrical windings and constraining radial expansion of said annular member.

11. Apparatus as in claim 10, wherein said composite material includes stiff and strong plastic matrix material, and said high-strength filamentary material is embedded within said matrix material and is wound about said annular member at an angle of approximately 90° relative to the central axis of said member.

12. Apparatus as in claim 10, wherein said composite material has a coefficient of thermal expansion of no more than approximately zero.

13. Apparatus as in claim 12, wherein said composite material has a negative coefficient of thermal expansion.

14. Apparatus as in claim 13, wherein said composite material includes high-strength filamentary material wound about said annular member at an angle of approximately 90° relative to the central axis of said member.

15. Apparatus as in claim 10, wherein said annular member is formed in part of said composite material and in part of lightweight nonmagnetic metal.

* * * * *

UNITED STATES PATENT OFFICE
CERTIFICATE OF CORRECTION

PATENT NO. : 4,838,392
DATED : June 13, 1989
INVENTOR(S) : L. R. Miller et al., Erie, Pa.

It is certified that error appears in the above-identified patent and that said Letters Patent is hereby corrected as shown below:

Col. 1, line 3, after the Title, insert the following:

--This invention was made with Government support under Government contract DAAE07-83-C-R092 awarded by Department of the Army, United States Army Tank-Automotive Command. The Government has certain rights in this invention.--

Signed and Sealed this

Twenty-ninth Day of June, 1993

Attest:

MICHAEL K. KIRK

Attesting Officer

Acting Commissioner of Patents and Trademarks